J. W. NEAL.
Seed Separator.
No. 66,872.
Patented July 16, 1867.
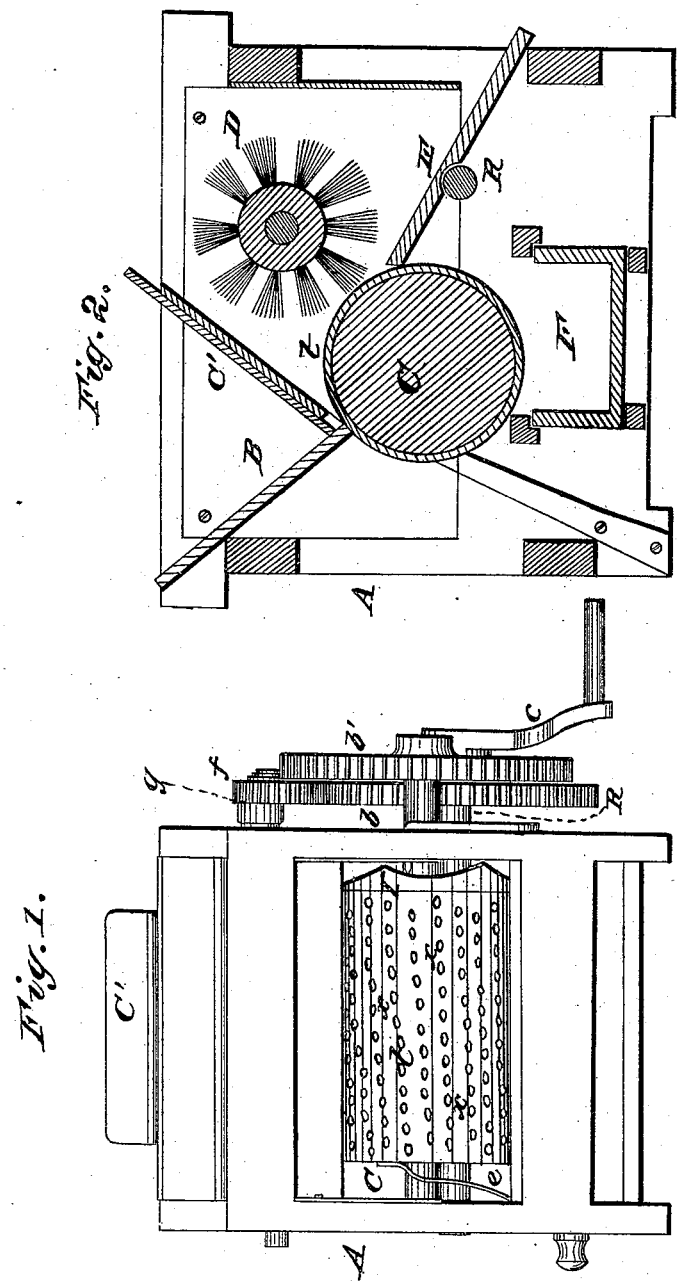

United States Patent Office.

JAMES W. NEAL, OF BIG LICK, VIRGINIA.

Letters Patent No. 66,872, dated July 16, 1867.

---

IMPROVEMENT IN COCKLE AND GARLIC-SEPARATORS.

---

The Schedule referred to in these Letters Patent and making part of the same.

---

TO ALL WHOM IT MAY CONCERN:

Be it known that I, JAMES W. NEAL, of Big Lick, in the county of Roanoke, and in the State of Virginia, have invented certain new and useful Improvements in Cockle and Garlic-Separator; and do hereby declare that the following is a full, clear, and exact description thereof, reference being had to the accompanying drawings, and to the letters of reference marked thereon, making a part of this specification.

Figure 1 represents an end view, and
Figure 2 a longitudinal vertical section.

In the annexed drawings, A represents the frame of the separator, which has a suitable hopper, B, at the upper forward end, and the usual inclined board E, for conveying the grain from the machine. C represents a wooden cylinder, which is secured upon a horizontal shaft within the frame under the hopper, and readily works back and forth upon the said shaft when making its ordinary revolutions. This cylinder is covered with a perforated metal plate, $t$, and provided with a corrugated bar, I, upon one end, which rests against a small pin or lug, $m$, connected to the inside of the frame. Upon the other end of this cylinder is a small spring, $e$, secured to the frame and resting against the cylinder, for the purpose of throwing it back after being forced out by the pin and corrugated bar. The perforations $\times \times \times$ in the cylinder are formed oblong and oval, to correspond with the shape of the cockle, which is caught therein. To the rear and above the cylinder C is placed a revolving brush, D, upon the shaft within the frame A, which sweeps the grain on to the board E, and keeps the cylinder clean. R represents a short shaft, having its bearings within the frame under the board E, and provided with a large cog-wheel, $b$, upon its outer end. This cog has a crank, $c$, and a small cog (not shown) formed on it between the crank and main wheel, into which meshes another large cog-wheel upon the end of the cylinder-shaft $b'$. $f$ is an idle-wheel, which is placed above the cog $b$, and which meshes into said cog and a small one, $g$, on the end of the brush-shaft for revolving the brush in a downward direction as the cylinder comes up.

In the operation of this separator, the grain to be cleaned is placed into the hopper B, which has a small outlet, $a$, and which outlet is closed or opened, as required, by the sliding-plate C'. The machine is put in motion, and the grain allowed to fall through the outlet $a$ upon the revolving cylinder C, when it is carried around and swept upon the board E by the revolving brush D, while the cockle, &c., drops into the perforations $\times \times$ in the plate $t$, and carried around until it reaches a point above the drawer F, where it drops into said drawer.

Having thus fully described my invention, what I claim as new, and desire to secure by Letters Patent, is—

1. The cylinder C, with perforated metal plate $t$ and corrugated bar I, when constructed and used substantially as herein specified.

2. The combination and arrangement of the frame A with hopper B, cylinder C, as constructed, brush D, board E, and drawer F, all operating in the manner and for the purposes specified.

In testimony that I claim the foregoing I have hereunto set my hand this 28th day of March, 1867.

J. W. NEAL.

Witnesses:
A. M. MARR,
J. M. MASON.